United States Patent [19]

Bradley

[11] Patent Number: 5,330,065
[45] Date of Patent: Jul. 19, 1994

[54] CARTRIDGE FILTER CLEANING ROTATABLE RACK

[76] Inventor: James A. Bradley, 717 North Halifax Dr., Ormond Beach, Fla. 32176

[21] Appl. No.: 940,492

[22] Filed: Sep. 4, 1992

[51] Int. Cl.⁵ ............................................. A47F 5/00
[52] U.S. Cl. ................................. 211/163; 134/138; 134/157; 108/139
[58] Field of Search ............. 134/140, 141, 138, 200, 134/900, 152, 153, 157; 211/163, 44; 108/139

[56] References Cited

U.S. PATENT DOCUMENTS

| | | | |
|---|---|---|---|
| 391,347 | 10/1888 | Valentine | 211/163 |
| 1,396,246 | 11/1921 | Bouvier | 108/139 |
| 1,512,442 | 10/1924 | Arnold | 248/349 |
| 1,628,013 | 5/1927 | Twedt | 108/139 |
| 1,814,998 | 7/1931 | Yocum | 248/349 X |
| 2,470,165 | 5/1949 | Hartzler | 108/139 |
| 2,687,267 | 8/1954 | Copenhaver | 248/349 |
| 2,755,583 | 7/1956 | Loeb | 211/163 X |
| 3,070,103 | 12/1902 | Packard et al. | 134/141 |
| 3,139,189 | 6/1964 | Kolarik | 108/139 X |
| 3,428,060 | 2/1969 | Spivey | 134/138 X |
| 3,526,237 | 9/1970 | Neill | 134/58 |
| 3,650,283 | 3/1972 | Lang | 134/140 X |
| 3,765,051 | 10/1973 | Wanat | 15/302 |
| 4,350,174 | 9/1982 | Bolten et al. | 134/153 |
| 4,448,209 | 5/1984 | Lindsay | 134/141 |
| 4,699,162 | 10/1987 | Huddle et al. | 134/141 |
| 5,031,779 | 7/1991 | Szenay et al. | 211/163 X |
| 5,074,421 | 12/1991 | Coulter | 211/163 X |
| 5,095,928 | 3/1992 | Phipps | 134/138 |

FOREIGN PATENT DOCUMENTS

| | | | |
|---|---|---|---|
| 247565 | 12/1947 | Switzerland | 108/139 |
| 213507 | 4/1924 | United Kingdom | 108/139 |

Primary Examiner—Frankie L. Stinson

[57] ABSTRACT

A rotatable holding rack to facilitate the process of cleaning reusable washable cartridge filters, such as those filters commonly used with swimming pool filtration systems. A vertically positioned cartridge filter is securely mounted onto a rotatable wash rack and is held in a stationary mode as the frontally exposed area is washed clean by a hand-held jet-nozzeled water hose. The filter unit is then revolved to the next selected frontal exposure, by rotating a finned circular flat platform to which the filter unit is attached, by redirecting the water-force of the hand-held hose to rotatable platform fins.

8 Claims, 3 Drawing Sheets

CARTRIDGE FILTER CLEANING ROTATABLE RACK

BACKGROUND-FIELD OF INVENTION

This invention relates generally to the subject of cleaning reusable washable filtration components. More specifically, my invention is directed toward the waterpressure flushing of cartridge filters, such as those filters commonly used with swimming pool filtration systems.

BACKGROUND-DESCRIPTION OF PRIOR ART

It is commonly acknowledged that the manual procedure of cleaning and flushing reusable cartridge filters, by means of hand-held high waterpressure hosing, presents an awkward and water-wasteful operation.

The most commonly used washable filter elements are cylindrically shaped, whereby it is necessary to either walk around the vertically positioned filter as it is being hose-flushed, or to rotate it to the position of the user. Furthermore, this type of washable filter elements are elongated and have a small semi-flexable footprint. The waterpressure that is required for this cleaning method, stresses the pliable base and the pleated polyester fabric media of an improperly supported filter element.

Filter elements are often damaged and eventually ruined, if they are not securely held against an average lateral waterpressure of 60 pounds per square inch. Further, poorly stabilized filter elements are usually not thoroughly cleaned under these conditions. This drawback causes shorter filtering cycles and more frequent cleaning, bringing about the negative environmental effect of wasting water.

Evidence of prior art that addresses these problems within my appended embodiment concept does not appear to be obvious and apparent. The disclosures of Neill U.S. Pat. No. 3,526,237 (1970), and Wanat U.S. Pat. No. 3,765,051 (1973), teach that cylindrically shaped filter elements are presented to liquid washing forces with complex, mechanically sensitive devises.

OBJECTS AND ADVANTAGES

A principal object of the present invention is to provide a rotatable filter-washing-rack that facilitates the manual process of hand-held waterpressure-hose-cleaning of reusable cartridge filters.

Additionally, several objects and advantages of the present invention are:

To provide a rotatable washing rack that is both water and time conserving. This objective is attained, wherein the operational efficiency of my invention minimizes the time and water requirements of cleaning cartridge filters, i.e. a color-coded locator provides visual reference to cleaned and uncleaned exposures. This novel art precludes the need for the commonly practiced water-wasteful-searching to assure ultimate satisfactory cleaning of the filter.

To provide a rotatable washing rack that performs the duel function of alternately retaining a static cartridge filter to a fixed frontal position during the washing phase, and then rotating the cartridge filter to a newly selected frontal position. This objective is attained with a water driven rotatable platform to which the filter element is mounted.

To provide a rotatable washing rack with a lightweight, portable and yet stabilized base. This objective is attained by utilizing water as temporary and disposable ballast.

To provide a rotatable washing rack that is of simple and basic design, which provides durability and longevity in a high-waterpressure, and residual chemical environment. This objective is attained by the preferred primary use of non-metallic synthetic polymers and thermoplastics in its composition.

To provide a rotatable washing rack that maintains the integrity of cartridge filters during the cleaning operation. This objective is attained by disclosing an improved filter support assembly which is easily, quickly, and efficiently adaptable for supporting cartridge filters of various sizes, and for positively supporting the filter during the operation thereof.

To provide a rotatable washing rack that is both practical and inexpensive to manufacture. This objective is attained by utilizing existing production facilities, commonly used materials, and current technology.

To provide a rotatable washing rack that is lightweight, portable, compact for convenient storage, and user friendly. These objectives are attained in this embodiment.

Still further objects and advantages will become known from a consideration of the ensuing description and drawings.

BRIEF DESCRIPTION OF THE DRAWINGS

Preferred embodiments of the invention are shown in the accompanying drawings of which.

| 10 | fixed base | 18 | support wheels |
| --- | --- | --- | --- |
| 10-a | filler aperture | 20 | axles |
| 10-b | hub unit | 22 | retainer collar (lower) |
| 10-c | center aperture | 22-a | retainer collar adaptor |
| 10-d | base top | 24 | sleeved retainer |
| 12 | stanchion | 24-a | sleeved retainer handle |
| 14 | rotatable platform | 26 | cartridge filter element |
| 16 | platform fins | 28 | water ballast |

DESCRIPTION OF A PREFERRED EMBODIMENT

Figure 1:
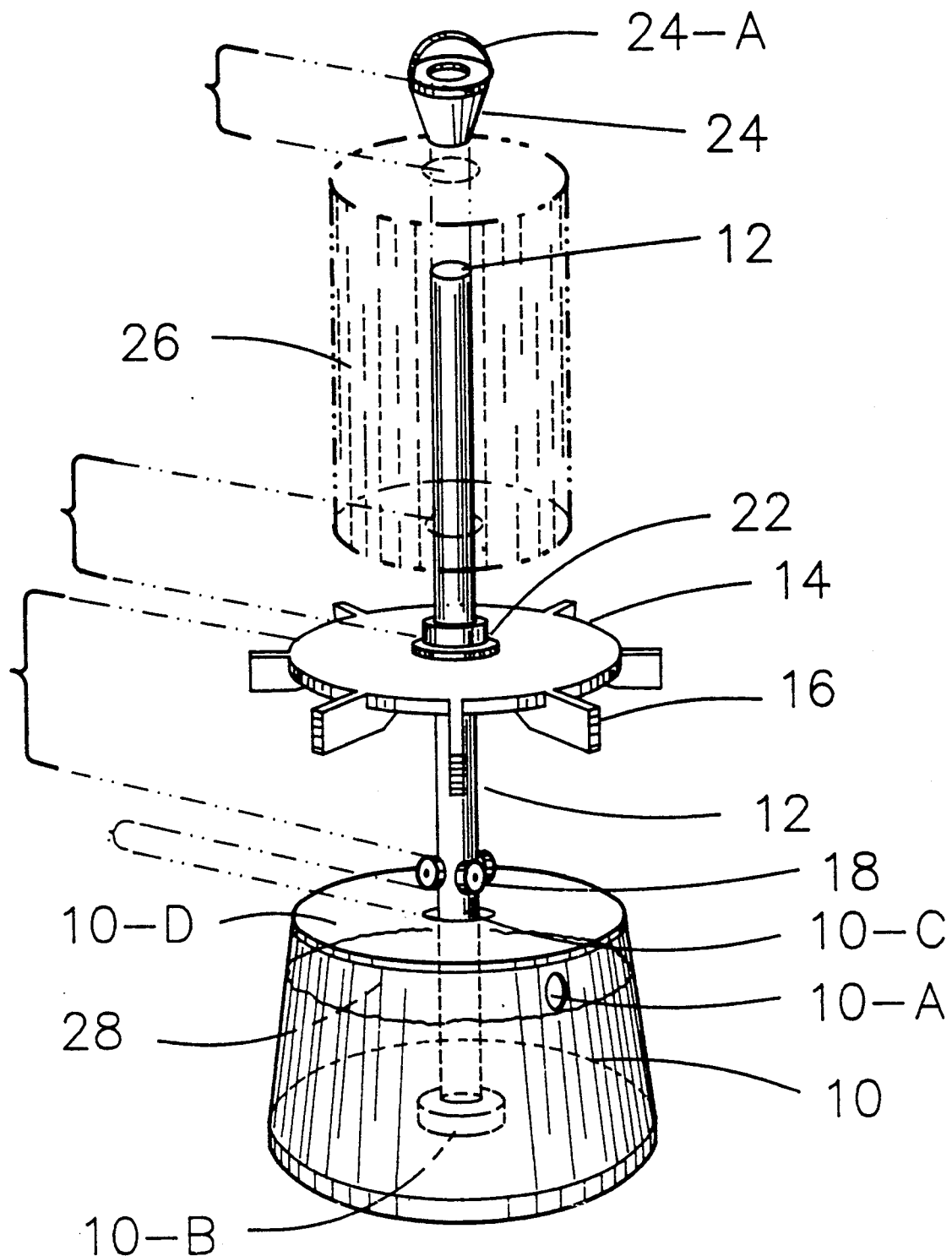
FIG. 1 is a exploded isometric view illustrating my invention with the filter element shown in phantom.
Figure 2:
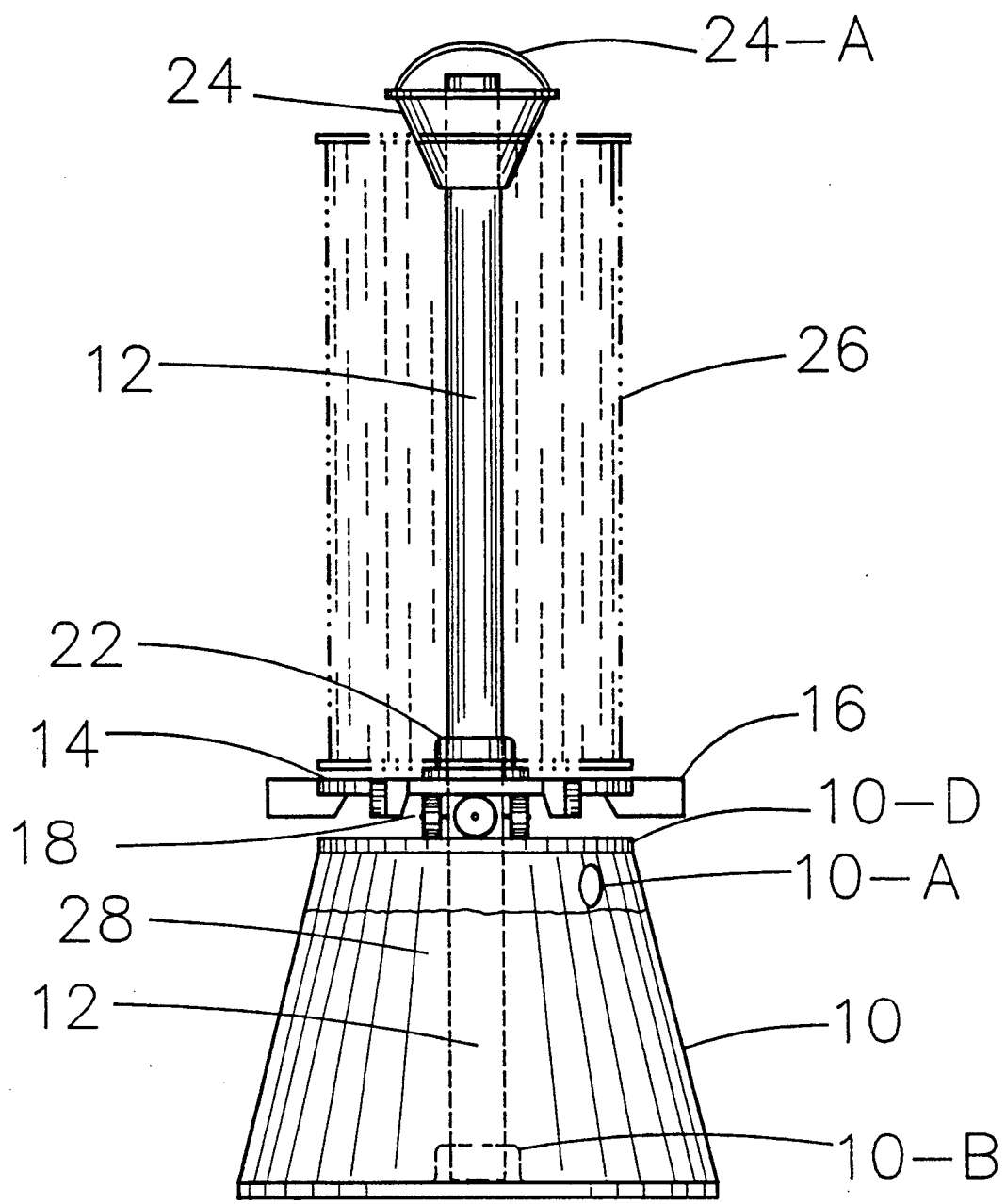
FIG. 2 is an elevational view showing a preferred embodiment of the present invention.

Referring to the drawings, FIG. 1 is an exploded isometric view and FIG. 2 is an elevational view of a basic version of my invention showing the interrelationship of its components. A stationary base 10 comprised of a preferable circular flat bottom of a predetermined thickness and circumferential walls that are inclined from perpendicular, whereas the footprint of the stationary base 10 area is greater than the solid circular flat top 10-d. The flat top 10-d is securely attached to the walls of the stationary base 10. Whereas the stationary base 10 presents a unitary seamless water containment vessel, the introduction of water as ballast 28 is attained in this preferred embodiment. A water-filling aperture 10-a is disposed at a high elevation of the stationary base sidewall. The stationary base 10 disposes an integral hub unit 10-b in the geometrical center of its interior floor, whereby the hub unit 10-b is operatively connected with a perpendicular rotatable elongated tubular stanchion 12. The stationary base 10 disposes an aperture 10-c through the geometrical center of its top horizontal plane 10-d, through which the rotatable stanchion 12 passes and by which the rotatable stanchion 12 is laterally supported.

Figure 3:
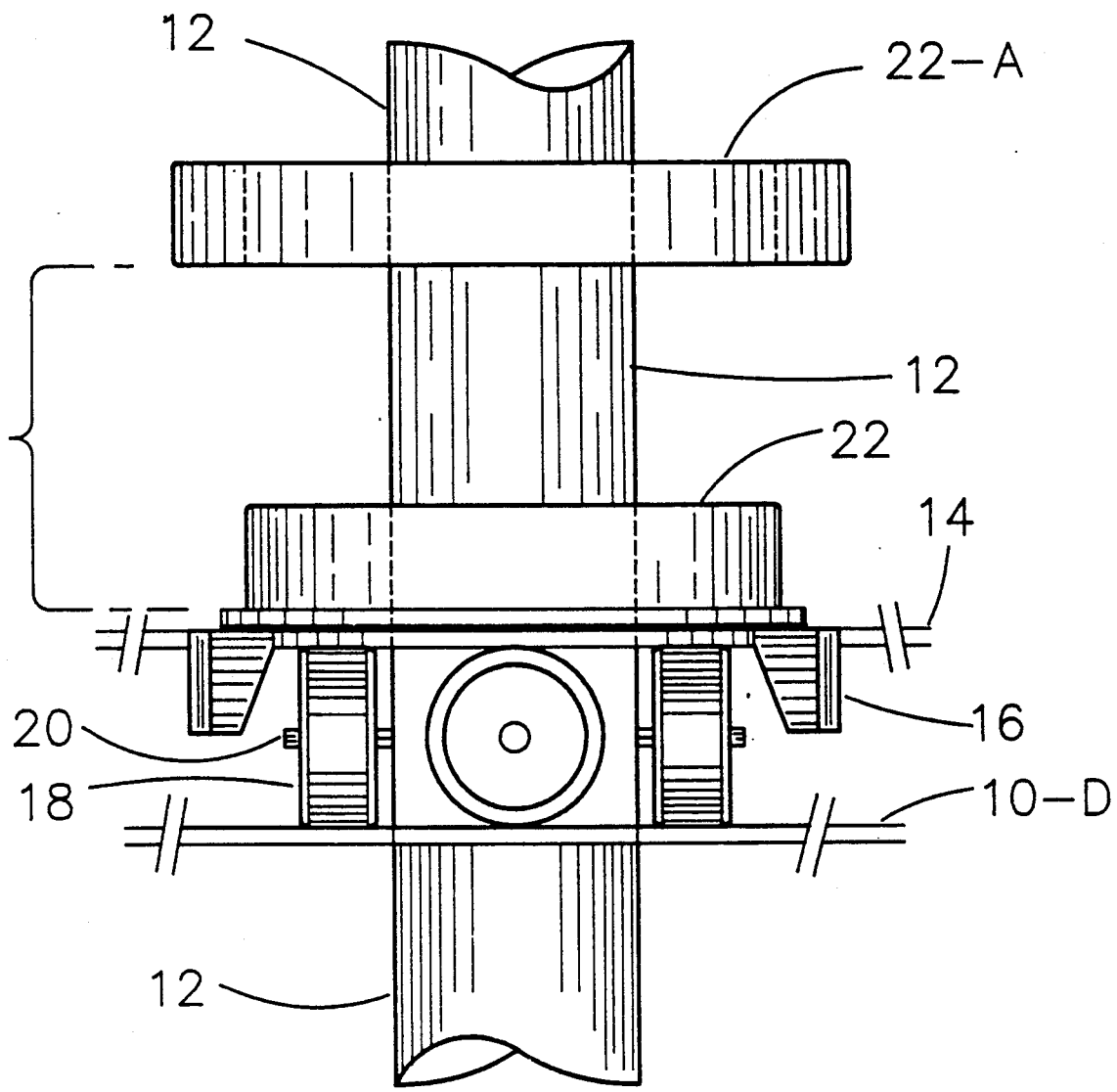
FIG. 3 is an enlarged fragmentary elevational view showing greater detail of component interfacing.

The stanchion 12 is rotatably supported on the top of the stationary base 10, whereby stanchion 12 disposes a plurality of rotatable support wheels 18 circumferentially spaced at a predetermined elevational point, in a manner that the support wheels 18 bear on and track on the top planar surface 10-d of the of the stationary base 10-d. The support wheels 18 rotate on horizontal axles 20 which are attached to the stanchion 12 by means of threaded axles 20 and threaded holes. FIG. 3 is an enlarged fragmentary view illustrating in greater detail, the support wheels 18 and other component interrelationships.

A flat rotatable platform 14 communicates with the support wheels 18, whereby the bottom plane of the rotatable platform 14 bears on and tracks on the top of the support wheels 18. The flat rotatable platform 14 is circularly shaped and disposes a plurality of outwardly and downwardly protruded fins 16 equally and circumferentially spaced on its outer perimeter. The rotatable platform 14 disposes an upwardly flanged aperture 22 in its geometrical center, in a manner that the rotatable platform 14 and the rotatable stanchion 12 are non-impinging upon one another. The upwardly directed flanged collar 22 provides receiving and lateral support means to the lower end opening of the filter element 26. The filter element 26, is illustrated in phantom in these drawings as it is not part of the present invention.

The rotatable stanchion 12 communicates with an inverted conically shaped sleeved retainer 24 by a slidable friction-tight connection, whereby frequent placement and removal of the sleeved retainer 24 is accommodated. The sleeved retainer 24 disposes a flexible swing-away handle 24-a. The handle presents a D-shaped loop grip configuration when attached at two opposite points of the circular retainer top. The sleeved retainer 24 presents a plurality of embossed contrasting solid colors on its top planar surface, divided into equal quadrants there upon.

The matter of using the rotatable holding rack involves the placement of the uncleaned filter element 26 onto the rotatable platform 14 and installing the conical retainer 24. The conical sleeved retainer 24 is complementarily shaped to allow its simultaneous insertion into the top center core aperture of the filter element 26, and slidable onto the rotatable stanchion 12, thereby providing lateral stability to the filter element 26. The base of the filter element 26 bears on the rotatable platform 14, and is subsequently engaged by the complementarily shaped retainer collar 22, whereby added lateral stability is provided to the filter element 26.

As the cleaning process begins, water is introduced as ballast, into the base unit 10 through the filling aperture 10-a. After the cleaning process has been completed, the sleeved retainer 24 is removed, using the handle 24-a, and the filter element 26 is removed from the holding rack.

The preferred manner in which filter elements 26 are cleaned, employs a hand-held jet-nozzled water hose from a fixed frontal position. The filter element 26 must remain stationary and in a vertical position, until the exposed area has been cleaned. The present invention provides a static holding mode during the washing phase. Once the exposed frontal area has been cleaned, the user redirects the water-force downwardly to the rotatable platform fins 16, whereby the laterally applied water-force causes the dynamic rotation of the filter element 26, the rotatable platform 14, and the rotatable stanchion 12. Only after water-force is removed from the platform fins 16, does the assemblage stop at a newly selected position. The color coding on the top of the sleeved retainer 24, provides a reference locator for cleaned and uncleaned filter exposures.

The accommodation of variously sized filter elements 26 is provided in this preferred embodiment, whereas the rotatable stanchion 12 communication with the sleeved retainer 24 is slidable and friction-tight. Whereas this attachment method permits infinite vertical positioning along the body of the rotatable stanchion 12, filter elements 26 of differing heights are securely engaged automatically. The flexible swing-away handle 24-a, allows the lower positioning of the retainer 24 without impedance. The differing sizes of filter element 26 center cores, is accommodated by the use of adjunctive adaptor collars 22-a at the filter element 26 lower end, as illustrated in FIG. 3 of the drawings. The conically shaped sleeved retainer 24 engages differing upper element end cores automatically.

Although but one preferred embodiment of the present invention has been described and illustrated, it will be understood that obvious changes may be made within the scope of the appended claims without departing from the spirit of my invention.

SUMMARY, RAMIFICATIONS AND SCOPE

Accordingly, it should be understood that the rotatable washing rack of the present invention can be used with ease and convenience in the manual cleansing process of washable cartridges filters whereby:

It presents a stable devise for holding vertically positioned cartridge filters in a static mode during the waterpressure cleaning operation.

It permits the simple function of placing an uncleaned cartridge filter onto the rotatable washing rack, without need for elaborate clamps or brackets.

It permits the simple function of lifting the cartridge filter from the rack, after it has been cleansed.

It achieves the objective of washing reusable cartridge filters by manually controlling a jet-nozzled hose being frontally directed at the stationary cartridge filter until that area is clean. By redirecting the water-force to rotatable platform fins, the filter is rotated from a cleaned position to a newly selected frontal exposure. This process is repeated until the operation is complete.

Although the description above presents novel development, it should not be construed as limiting the scope of the invention but as merely illustrating some of the presently preferred embodiments of this invention.

What I claim is:

1. A rotatable device for holding objects, comprising a hollow vessel pedestal base, whereby said pedestal base is comprised of a solid flat bottom having an interior floor, a solid flat top, said flat bottom and flat top being parallel, and an inclined circumferential wall serving to connect said solid flat bottom and said solid flat top, whereas said pedestal base disposes an elongated tubular rotatable stanchion extending perpendicularly from the center of the interior floor of said pedestal base, through an aperture in the center of said solid flat top, said rotatable stanchion protrudes above said pedestal base, thereby providing receiving and holding means for a cartridge filter, said rotatable stanchion disposes a plurality of rotatable support wheels, said support wheels being circumferentially spaced on said rotatable stanchion, said support wheels providing the total support means for said rotatable stanchion and a flat rotatable platform on top thereof.

2. The rotatable device for holding objects of claim 1, whereby said pedestal base provides ballast means by disposing itself as a unitary seamless water containment vessel, said vessel having water filling means by the disposition of an aperture at a high elevation on said vertical wall of said pedestal base.

3. The rotatable devise for holding objects of claim 1, whereby said flat bottom of said pedestal base disposes an integral fixed hub unit at the geometrical center of its interior plane, said hub unit is operatively connected to said rotatable stanchion, said flat top disposes an aperture through its geometrical center point, whereby lateral stabilizing means is provided to said rotatable stanchion.

4. The rotatable device for holding objects of claim 1, whereby said rotatable stanchion is of straight hollow tubular configuration, said rotatable stanchion disposes a plurality of support wheels circumferentially spaced, wherein said support wheels bear on and track on the top plane of said pedestal base, thereby said support wheels provide rotational support means for said rotatable stanchion, said support wheels rotate on horizontal axles, said axles are attached to said rotational stanchion by means of threaded axles and threaded holds.

5. The rotatable device for holding objects of claim 1 wherein said flat rotatable platform is circularly shaped and of a uniform predetermined thickness, said rotatable platform disposes a plurality of outwardly and downwardly protruded fins, said fins being equally and circumferentially spaced at the outer perimeter of said flat rotatable platform, said rotatable platform disposes an upwardly flanged aperture at its geometrical center, said upwardly directed flanged collar thereby provides receiving and lateral restraint means to the lower end opening of a filter element, said rotatable platform having non-impinging rotational means in its relationship with said rotational stanchion, said rotational platform is supported by said support wheels on which its bottom plane bears and tracks.

6. The rotatable device for holding objects of claim 5, whereby said upwardly directed collar receives an adjunctive adaptor collar in a non-impinging slidable connection, whereby attachment means are provided for the lower end opening of variably sized filter elements.

7. The rotatable device for holding objects of claim 1, wherein a readily placable and replaceable inverted-conically-shaped sleeved retainer communicates with said rotatable stanchion in a friction-tight slidable engagement, whereby said sleeved retainer provides infinite position location means along the full upper length of said rotatable stanchion, said inverted-conically-shaped sleeved retainer provides self-adjusting engagement and holding means to the upper end opening of variable sized filter elements.

8. The rotatable device for holding objects of claim 7, wherein said removable sleeved retainer disposes a flexible swing-away handle, said handle having attachment means at two opposite points on the top plane thereby presenting a D-shaped loop grip, said removable sleeved retainer disposes a plurality of embossed contrasting solid colors in equally divided quadrants on its top planer surface.

* * * * *